United States Patent [19]
Whitney

[11] 4,379,363
[45] Apr. 12, 1983

[54] DAMPED REMOTE CENTER COMPLIANCE DEVICE

[75] Inventor: Daniel E. Whitney, Arlington, Mass.

[73] Assignee: The Charles Stark Draper Laboratory, Inc., Cambridge, Mass.

[21] Appl. No.: 257,220

[22] Filed: Apr. 24, 1981

[51] Int. Cl.³ .................................... G01B 5/25
[52] U.S. Cl. .................................... 33/169 C
[58] Field of Search .......... 33/169 C, 172 D, 185 R, 33/180 R; 29/406, 407

[56] References Cited

U.S. PATENT DOCUMENTS 4,155,169  5/1979  Drake ............................ 33/169 C
4,283,153  8/1981  Brendamour ................. 33/169 C X Primary Examiner—Harry N. Haroian
Attorney, Agent, or Firm—Joseph S. Iandiorio

[57] ABSTRACT

A damped RCC device including support means; operator means interconnected with the support means; mounting means spaced from the support means; a plurality of radial members extending between and attached to the support means at one end and the mounting means at the other end and having a focus at, near or beyond the free end of the operator member; and damping means disposed between the mounting means and at least one of the operator means and support means for suppressing vibrations in the RCC device.

15 Claims, 8 Drawing Figures

U.S. Patent    Apr. 12, 1983    Sheet 1 of 4    4,379,363

DAMPED REMOTE CENTER COMPLIANCE DEVICE

FIELD OF INVENTION

This invention relates to a damped remote center compliance device.

BACKGROUND OF INVENTION

A remote center compliance (RCC) device provides a remote center of compliance at, near or beyond the end of a suspended operator means or member. The operator member with the remote center near its tip is used for various assembly and engaging tasks, e.g. docking, holding tools, insertion. The remote center of compliance is a point about which rotation of the operator member occurs and with respect to which translation of the operator means occurs. RCC devices have five degress of freedom, rotation about the axis of the operator member, and rotation and translation along two mutually perpendicular axes orthogonal to the axis of the operator member. Since the normal use of RCC devices requires its movement and since the operator member is a suspended mass, RCC devices are subject to vibration and oscillation. Vibration and oscillation not only may be a structural problem but may also impair or slow the performance of the RCC device. This problem is complicated by the fact that the RCC device has a number of, i.e., five degrees of freedom.

SUMMARY OF INVENTION

It is therefore an object of this invention to provide an improved damped RCC device.

This invention features a damped RCC device including support means and operator means interconnected with said support means. There are mounting means spaced from the support means and a plurality of radial members extending between and attached to the support means at one end and the mounting means at the other end. The radial members have a focus at, near or beyond the free end of the operator means. Damping means disposed between the mounting means and at least one of the operator means and support means suppresses vibrations in the RCC device.

In a preferred embodiment damping means may be between the mounting means and the support means, or between the mounting means and the operator means. The damping means may include spring means or may include a viscid medium and sealing means containing the viscid medium. In one form of RCC device, the focus is coincident with the remote center of compliance of the RCC device. In another the support means includes a deformable portion. The RCC device may be of the type that includes an intermediate means between the mounting means and the support means. A plurality of radial members extends between and is attached to the intermediate means at one end, and at the other end one of the support means and mounting means. A plurality of parallel members extend between and are attached to the intermediate means at one end, and at the other end to the other of the support means and the mounting means.

DISCLOSURE OF PREFERRED EMBODIMENT

Other objects, features and advantages will occur from the following description of a preferred embodiment and the accompanying drawings, in which.

RCC devices are generally of two types. A first type, such as disclosed in U.S. Pat. No. 4,098,001, includes support means, an operator member carried by the support means, mounting means, and intermediate means. A plurality of radial members extend between the intermediate means and one of the support means and mounting means and have their focus at, near or beyond the free end of the operator means. A plurality of parallel members extend between the intermediate means and the other of the support means and mounting means. In this first type of RCC device the remote center of compliance is at the focus.

A second type of RCC device, as disclosed in U.S. Pat. No. 4,155,169, includes support means, operator means carried by the support means, and mounting means. A plurality of radial members extend between the support means and the mounting means and have a focus at, near or beyond the free end of the operator means. The support means includes a deformable portion which has a center of motion spaced from the focus in the direction toward the other end of the operator means which is attached to the support means. The remote center of compliance is between the focus and center of motion at a location which is a function of the relative stiffness of the radial members and deformable portion of the support means. Another variation of an RCC device is disclosed in U.S. Pat. No. 4,202,107.

In each type, the remote center of compliance is a point about which rotary motion and with respect to which translational motion of the operator means occur. The disclosures of U.S. Pat. Nos. 4,098,001, 4,155,169, and 4,202,107, are incorporated here by reference.

Figure 1:
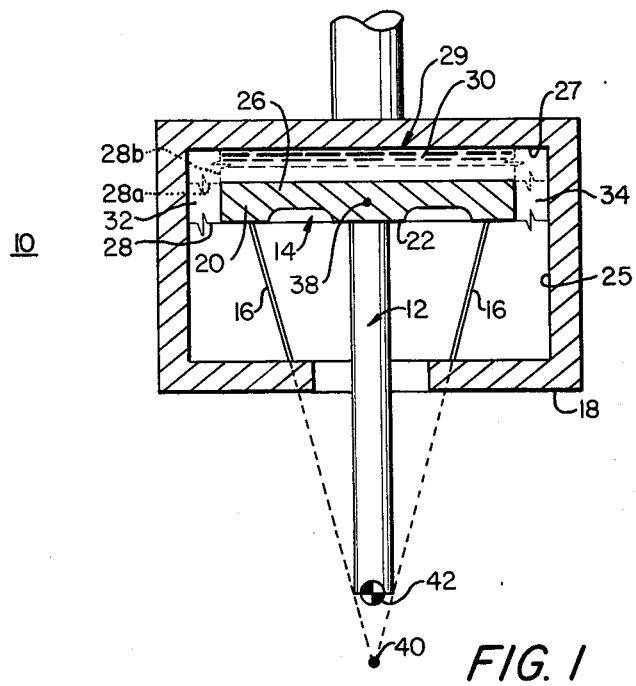
FIG. 1 is a schematic diagram of a damped RCC device according to this invention.

There is shown in FIG. 1 an RCC device 10 which is generally of the type shown in U.S. Pat. No. 4,155,169, having an operator member 12 carried by support member 14 interconnected by three radial members 16, only two of which are visible, to mounting means, frame 18. Support member 14 includes an annular member 20 interconnected with a central portion 22 by a deformable portion 26. Deformable portion 26 establishes a center of motion 38, and radial members 16 have focus 40, resulting in a remote center of compliance 42 between those two points at the free end of operator member 12. Interconnected between annular portion 20 and the walls of frame 18 is a diaphragm 28. The damping forces may occur by a pumping action or shear action. For example, in FIG. 1, if support member 14 is moved to the left, grease 30 between annular member 20 and the wall of frame 18 is pumped out of the area between annular section 20 on the left, 32, and into the area 34 at the right. Diaphragm 28 in combination with inner wall 25 and upper surface 27 of frame 18 and support member 14 form a chamber 29 that contains the viscid damping medium 30 such as ASTM grade H or J. There are also shear forces created in grease 30. If diaphragm 28 is placed at the position of diaphragm 28a, shown in phantom, or 28b, then the pumping action does not occur but the shear forces still do.

Figure 2:
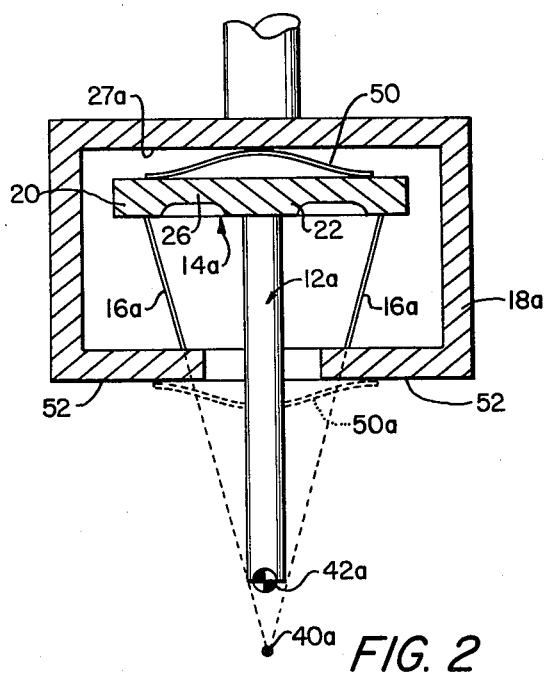
FIG. 2 is a view similar to FIG. 1 using alternative damping means.
Figure 3:
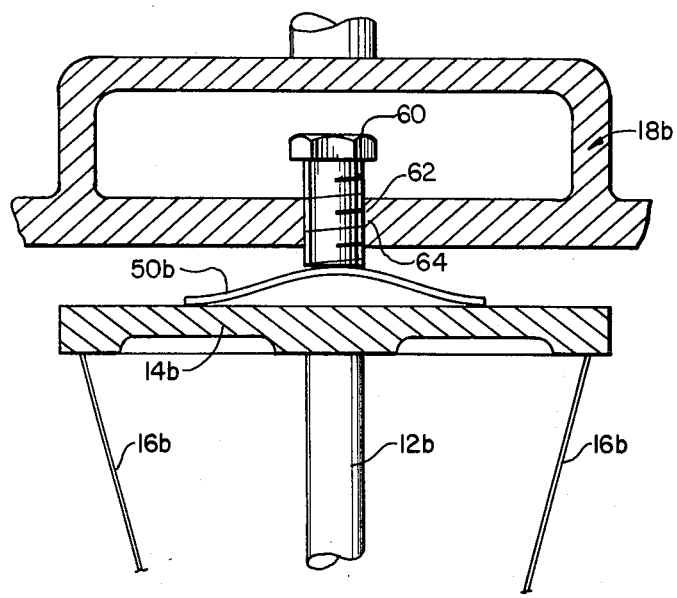
FIG. 3 is an enlarged view similar to FIG. 2 of a portion of an RCC device showing an adjustable damping means.

Alternatively, instead of a viscid medium in a chamber 29 the damping function may be provided by a spring 50, FIG. 2, which bears on the upper surface 27a of frame 18a and the top of support member 14a. Spring 50 is not necessarily located between support member 14a and surface 27a. It may, for example, be attached to the lower portion of operator member 12a as indicated by spring 50a, whose outer extremities bear on the undersurface 52 of frame 18a, or both springs may be used. The damping means may be made adjustable by applying a variable pressure to spring 50b, FIG. 3, by means of a pressure screw 60 whose threads engage with threads 62 in hole 64 of frame 18b. As screw 60 is moved inwardly toward plate 14b, spring 50b becomes stiffer and the damping force stronger. Similar adjustment means can be provided for spring 50a.

Figure 4:
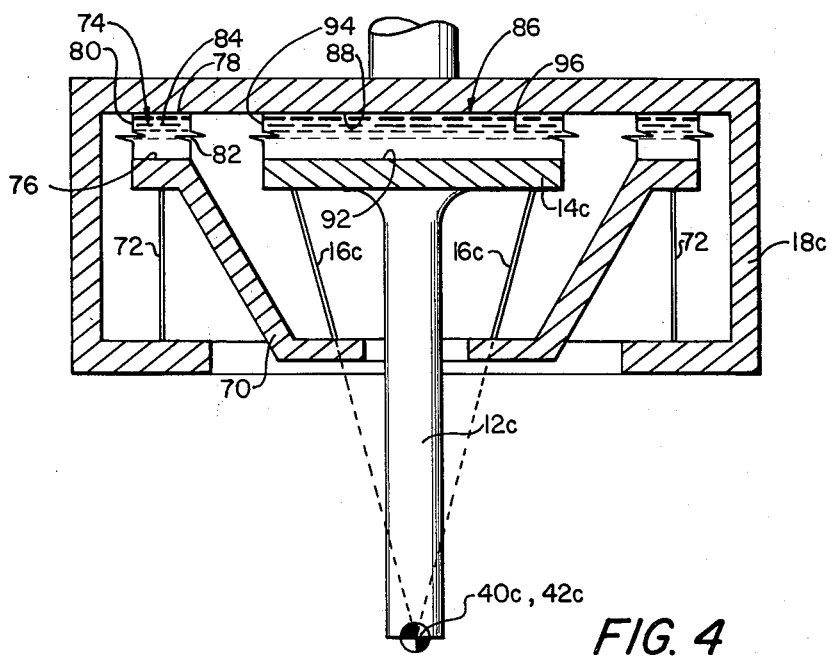
FIG. 4 is a diagrammatic view of another type of damped RCC device according to this invention.

Damping of the type of device shown in U.S. Pat. No. 4,098,001 may be accomplished as shown in FIG. 4 in which operator member 12c is carried by support plate 14c interconnected by means of radial members 16c with an intermediate member 70 which in turn is interconnected by means of three or more parallel members 72, only two of which are visible, with frame 18c. A damping chamber 74 may be formed between the upper annular surface 76 of intermediate member 70 and the surface 78 of frame 18c. The chamber is closed by diaphragms 80 and 82 to contain viscid medium 84 therein. Chamber 86 may also be provided between surface 88 of frame 18c and surface 92 of member 14c, sealed by diaphragm 94 to contain viscid medium 96. In this device radial members 16c have a focus at point 40c which is coincident with the remote center of compliance 42c. Parallel members 72 effectively have a center at infinity with respect to which translational motion occurs.

Figure 5:
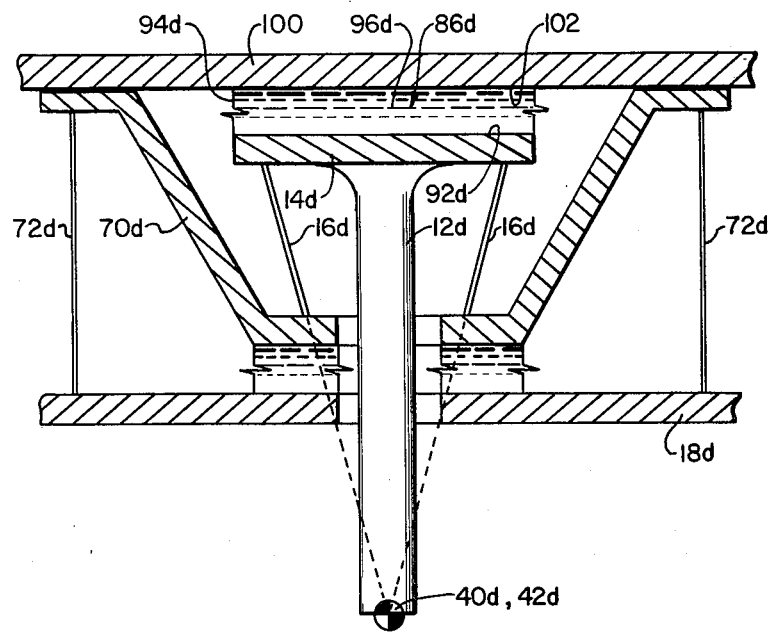
FIG. 5 is a view of an RCC device similar to FIG. 4 showing an alternative damping technique.

In an alternative construction, intermediate member 70d, FIG. 5, may include a cover portion 100 between whose surface 102 and surface 92d of member 14d is created chamber 86d in which viscid medium 96d is sealed by diaphragm 94d.

Figure 6:
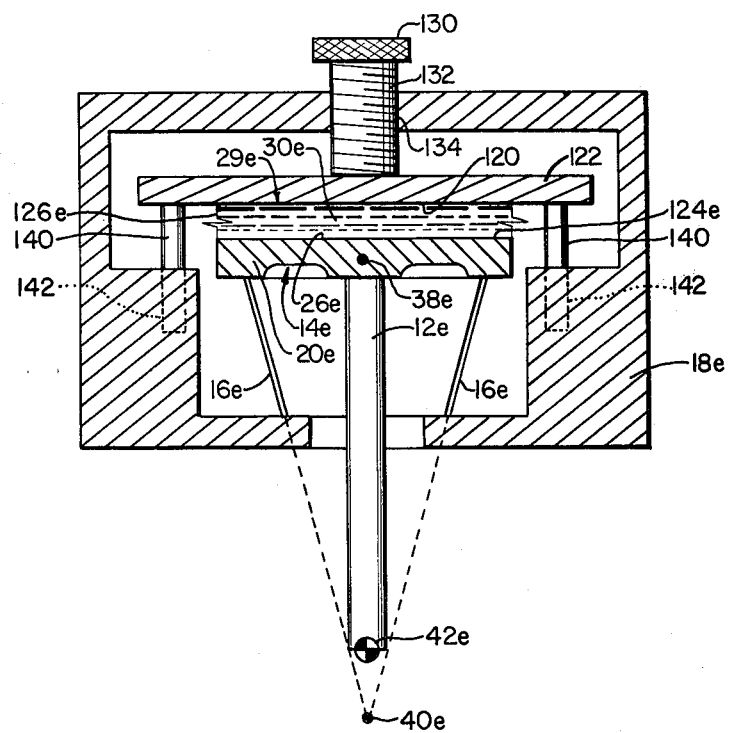
FIG. 6 is a diagrammatic view of a damped RCC device similar to FIG. 1 with damping adjustment means.

The viscid medium implementation of damping means may be made adjustable, just as may the spring implementation. For example, as shown in FIG. 6, damping chamber 29e formed between surface 120 of plate 122 and surface 124e of member 14e is sealed by diaphragm 126e to contain viscid medium 30e. To increase the damping force, screw 130, whose threads 132 are engaged with threads 134 in frame 18e, is tightened on plate 122 which moves downwardly guided by rods 140 in bores 142. This action moves plate 122 toward support member 14e; chamber 29e between surfaces 20 and 124e gets smaller, diaphragm 126e bulges, and the smaller space causes the damping force to increase.

Figure 7:
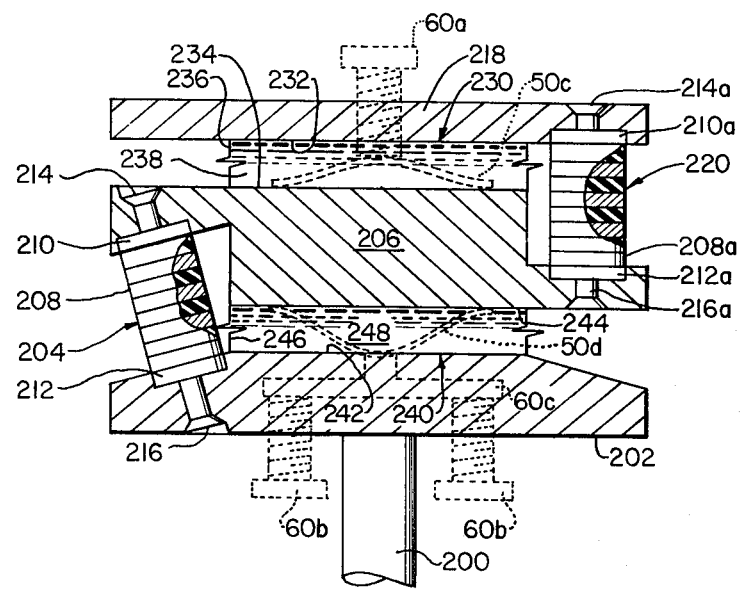
FIG. 7 is a diagrammatic sectional view of another construction of damped RCC according to this invention.

In another construction, FIG. 7, operator member 200 is suspended from support member 202 which is connected by three radial members 204, only one of which is visible, to intermediate member 206. Radial members 204 include a body 208 made of alternate thin layers of metal and rubber or other elastomeric material, with end caps 210, 212 that receive screws 214 and 216 which fasten radial member 204 to intermediate member 206 and support member 202, respectively.

Intermediate member 206 is interconnected with mounting means 218 by a plurality of parallel members 220 constructed in the same way as radial members 204 and mounted between intermediate member 206 and mounting means 218 in the same way using screws 216a and 214a, respectively. To provide damping, chamber 230 is provided between surface 232 of mounting plate 218 and surface 234 of intermediate member 206. Chamber 230 is sealed by diaphragm 236 to contain viscid medium 238. A similar chamber 240 is provided between surface 242 of support member 202 and surface 244 of intermediate member 206. Diaphragm 246 seals chamber 240 which contains viscid medium 248. Alternatively, as shown in phantom in FIG. 7, springs 50c and 50d may be used with adjustment screws 60a and 60b and plate 60c to provide damping.

Figure 8:
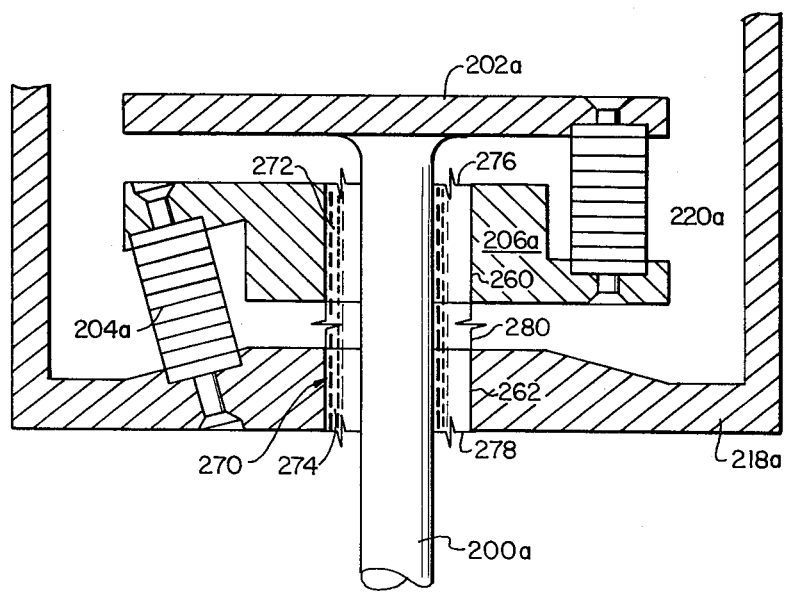
FIG. 8 is yet another construction of a damped RCC device according to this invention similar to that shown in FIG. 7.

The device of FIG. 7 may be constructed as shown in FIG. 8, with support member 202a above its intermediate member 206a. Member 206a includes a hole 260 to accommodate operator member 200a. A similar hole 262 is provided in mounting means frame 218a. Parallel members 220a interconnect support plate 202a and intermediate member 206a, while radial members 204a interconnect intermediate member 206a and frame 218a. Damping chamber 270 is created between operator member 200a and the surfaces 272 of hole 260 and 274 of hole 262. Chamber 270 is sealed by diaphragm 276 at the upper end, 278 at the lower end, and diaphragm 280 between intermediate member 206a and frame 218a. The RCC structures and damping implementation herein shown are illustrative only. Other RCC geometries and other damping implementations may be used according to this invention.

Other embodiments will occur to those skilled in the art and are within the following claims:

What is claimed is:

1. A damped remote center compliance system comprising:
   mounting means;
   a remote center compliance device including:
   support means;
   operator means interconnected with said support means;
   a plurality of radial members extending between and attached to said support means at one end and said mounting means at the other end and having a focus at, near or beyond the free end of said operator means; and
   damping means disposed between said mounting means and said remote center compliance device for suppressing vibrations in said remote center compliance device.

2. The damped remote center compliance system of claim 1 in which said damping means is between said mounting means and said support means of said remote center compliance device.

3. The damped remote center compliance device of claim 1 in which said damping means is between said mounting means and said operator means of said remote center compliance device.

4. The damped remote center compliance device of claim 1 in which said damping means includes spring means.

5. The damped remote center compliance device of claim 1 in which said damping means is adjustable to provide adjustable damping.

6. The damped remote center compliance device of claim 1 in which said damping means includes a viscid medium and sealing means for containing said viscid medium.

7. The damped remote center compliance device of claim 1 in which said focus is coincident with the remote center of compliance of said RCC device.

8. The damped remote center compliance device of claim 1 in which said support means includes a deformable portion.

9. A damped remote center compliance system comprising:
   mounting means;
   a remote center compliance device including:
   support means;
   operator means interconnected with said support means;
   intermediate means between said mounting means and said support means;
   a plurality of radial members extending between and attached to said intermediate means at one end and at the other end to one of said support means and mounting means and having a focus at, near or beyond the first end of said operator means;
   a plurality of parallel members extending between and attached to said intermediate means at one end and at the other end to the other of said support means and mounting means; and
   damping means disposed between said mounting means and said remote center compliance device for suppressing vibrations in said remote center compliance device.

10. The damped remote center compliance device of claim 9 in which said damping means is between said mounting means and said support means.

11. The damped remote center compliance device of claim 9 in which said damping means is between said mounting means and said intermediate means.

12. The damped remote center compliance device of claim 9 in which said support means is between said mounting means and said intermediate means.

13. The damped remote center compliance device of claim 9 in which said damping means includes spring means.

14. The damped remote center compliance device of claim 9 in which said damping means includes a viscid medium and sealing means for containing said viscid medium.

15. The damped remote center compliance device of claim 9 in which said damping means is adjustable.

* * * * *